United States Patent [19]

Leone et al.

[11] Patent Number: 5,448,675
[45] Date of Patent: Sep. 5, 1995

[54] TELECOMMUNICATIONS DISTRIBUTION FRAME WITH TRACING

[75] Inventors: Frank S. Leone, Berkeley Heights; Richard J. Pimpinella, Hampton, both of N.J.

[73] Assignee: AT&T IPM Corp., Coral Gables, Fla.

[21] Appl. No.: 255,621

[22] Filed: Jun. 9, 1994

[51] Int. Cl.[6] .............................................. G02B 6/36
[52] U.S. Cl. .................................... 385/135; 324/66; 361/827; 379/25; 385/134; 439/507
[58] Field of Search ............... 385/100, 134, 135, 147; 324/66; 361/826,827; 379/25; 439/502, 507, 577

[56] References Cited

U.S. PATENT DOCUMENTS

| | | | |
|---|---|---|---|
| 4,502,754 | 3/1985 | Kawa | 385/135 X |
| 4,752,110 | 6/1988 | Blanchet et al. | 385/135 |
| 5,107,532 | 4/1992 | Hansen et al. | 379/25 |
| 5,138,688 | 8/1992 | Debortoli | 385/135 |
| 5,149,277 | 9/1992 | LeMaster | 439/502 X |
| 5,265,187 | 11/1993 | Morin et al. | 385/135 |

*Primary Examiner*—John D. Lee
*Attorney, Agent, or Firm*—Lester H. Birnbaum

[57] ABSTRACT

Disclosed is a distribution unit which provides means for tracing patch connections. Each module is electrically connected to a shelf controller through a backplane. The shelf controllers are, in turn, coupled to a host computer. Pressing a button on one module lights an LED on that module and on the module which should be connected thereto based on the data base in the host computer.

10 Claims, 4 Drawing Sheets

TELECOMMUNICATIONS DISTRIBUTION FRAME WITH TRACING

BACKGROUND OF THE INVENTION

This invention relates to telecommunications equipment such as optical fiber distribution frames.

Optical fiber distribution frames, such as AT&T's lightguide cross-connect (LGX ®) distribution frame, serve the function of coupling incoming fiber optic cables to customer equipment. The frame typically includes a multiplicity of shelves, each shelf including a single or plurality of modules where the optical connections are made to the fibers of the incoming cable. Cross-connect jumper cables (also known as patch cords) are applied in the front of the apparatus between the panels which are to be optically connected (see, e.g., U.S. Pat. No. 4,630,886 issued to Lauriello et at.).

One of the problems which exists in typical frames is the high density of optical connections, typically 72-144 connections per shelf. The great number of cross-connections makes it very difficult to be able to determine if both ends of a jumper cable are properly connected.

In order to trace the fiber connections, it has been proposed to provide at one end of each jumper cable a light source which launches a light signal through the fiber jacket to light both ends of the jumper (see, e.g., U.S. Pat. No. 5,305,405 issued to Emmons et al.).

It is desirable to have an optical fiber distribution frame which gives an indication of where the fiber jumper cables should be connected, either for purposes of making the connection, or once the connection is made, to be able to tell where the opposite ends of a particular cable are connected. It is desirable to do this without an active light source involved in the tracing.

SUMMARY OF THE INVENTION

The invention is a telecommunications distribution frame having a plurality of shelves, each shelf including a plurality of modules for connecting a cable with jumper cables. The frame includes means for electrically connecting each module to a host which includes a data base indicating which modules are to be connected by a jumper cable. Means associated with a first module direct a first signal to the host to locate a second module to be connected thereto. Means associated with said first and second modules are provided for receiving a second signal from the host and for visually indicating that said second signal has been received from the host so that a visual indication is present on the two modules to be connected by a jumper cable.

BRIEF DESCRIPTION OF THE DRAWING

These and other features of the invention are delineated in detail in the description to follow. In the drawing.

DETAILED DESCRIPTION

Figure 1:
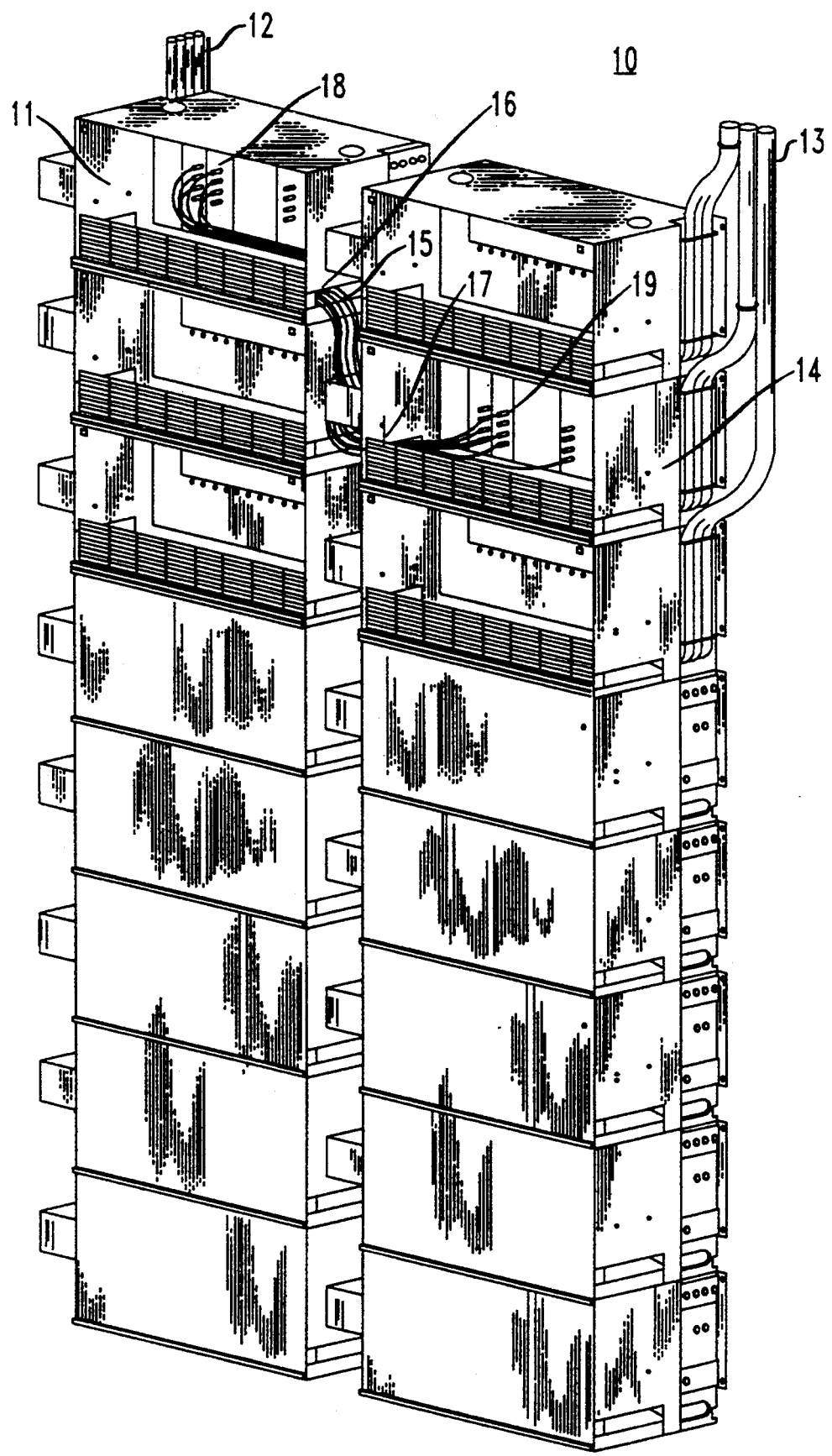
FIG. 1 is a perspective view of a fiber distribution frame including the invention in accordance with one embodiment.

FIG. 1 illustrates a typical fiber distribution frame 10 which may utilize the invention. The frame includes a plurality of shelves, e.g., 11 and 14, arranged in two columns in this example. Each shelf includes a plurality of modules, e.g., 18 and 19, where optical fibers from a trunk cable 12, or transmission cable 13, are connected with jumper fiber cables, e.g., 15, for purposes of cross-connection between the cables. Typically, the trunk cable 12 or transmission cable 13 is brought into the frame at the back and fibers from the cable are introduced into each module through an aperture which can be located at the front or rear of the shelves. In this example, all fiber connections are made in the front of the module.

For purposes of illustration, the doors of the top three shelves in each column have been removed. Again, for purposes of illustration, a set of jumper cables, e.g. 15, are shown connected from shelf 11 (e.g., module 18) through aperture 16 to shelf 14 (e.g., module 19) through aperture 17. Of course, any fiber from the trunk cable 12 can be connected with any fiber from the transmission cable 13 through an appropriate jumper cable connection. In this example, each of the shelves in the left-hand column has access to the trunk cable and each of the shelves in the right-hand column has access to the transmission cable, but other arrangements are possible.

It will be appreciated that the invention is also applicable for frames providing connections other than optical connections between cables (e.g., electrical).

Figure 2:
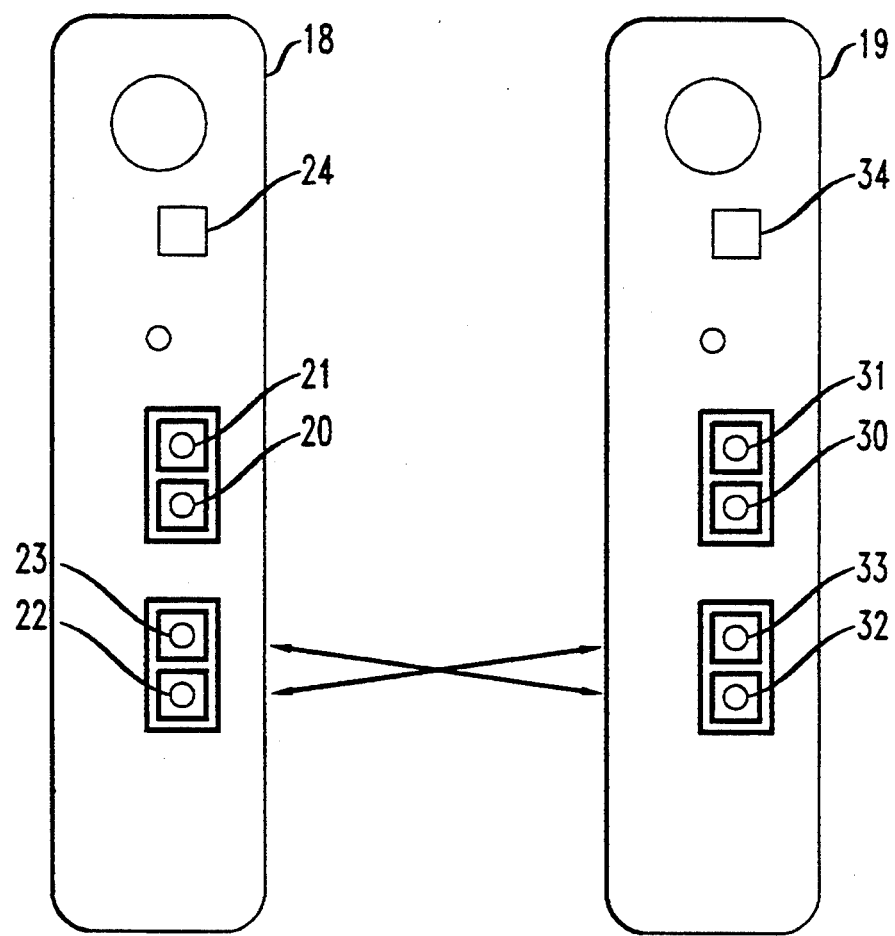
FIG. 2 is a more detailed view of two modules which are part of the fiber distribution frame of FIG. 1.

FIG. 2 gives more detail in the two modules, 18 and 19, which are to be optically connected by the jumper cable 15. Each panel includes a pair of jacks, 20, 21 and 30, 31, which receive standard optical connectors attached to a pair of fibers (not shown) from the trunk cable 12 in the case of module 18 or transmission cable 13 in the case of module 19. One of the jacks (20, 30) is adapted for receiving optical signals from a respective cable, and the other jack (21, 31) is adapted for transmitting optical signals to its respective cable. Each panel also includes a pair of jacks, 22, 23 and 32, 33, for optically connecting the two modules. As illustrated by the arrows, jack 22 of module 18 will be optically coupled to jack 33 of module 19, while jack 23 of module 18 will be optically coupled to jack 32 of module 19. Thus, plugging a jumper cable into the appropriate jacks of modules 18 and 19 will provide the necessary cross-connection between a pair of fibers from the central office (cable 12) and a pair of fibers coupled to a customer's equipment (cable 13).

Due to the high density of modules and jumper cables, it is often difficult to find the appropriate modules to be connected. In order to aid this process, each module includes a push-button light emitting diode, 24 and 34, which will light the appropriate modules to be connected in the manner to be described.

Figure 3:
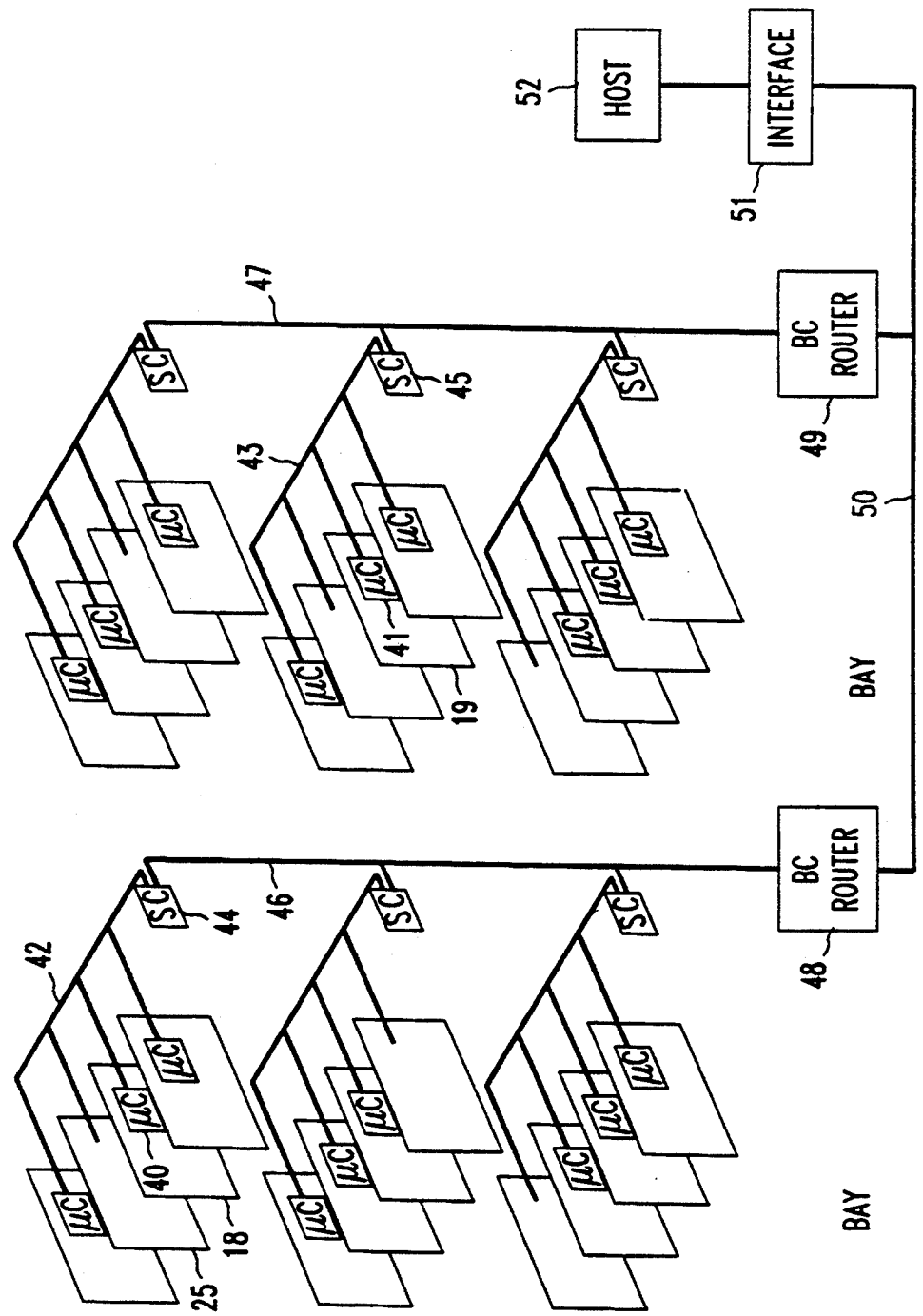
FIG. 3 is a schematic block diagram illustrating electrical connection between modules of the frame in accordance with an embodiment of the invention.
Figure 4:
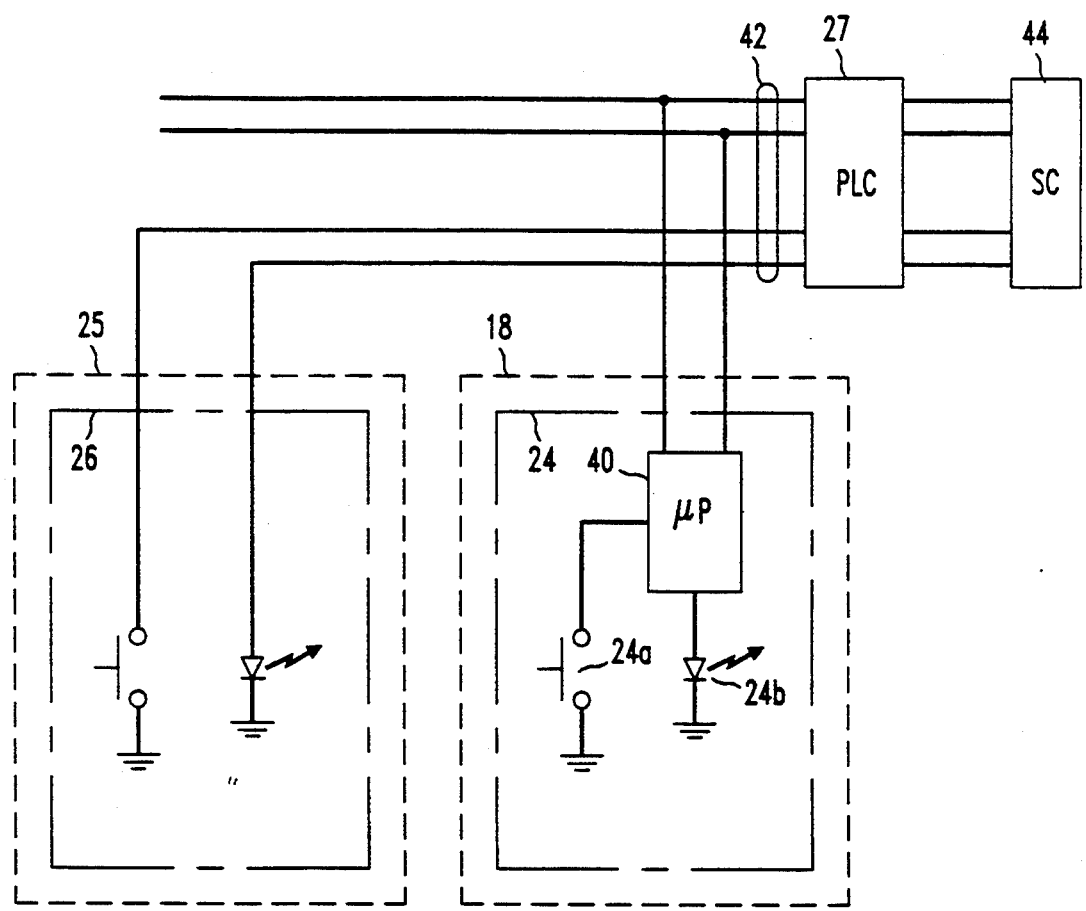
FIG. 4 is a schematic block diagram illustrating further details in the electrical connections in accordance with the same embodiment.

FIGS. 3 and 4 illustrate schematically how the modules are electrically interconnected to provide this function. Depending upon the application, some modules, e.g., 18 and 19, include a microprocessor, 40 and 41, electrically connected to the push-button LED, 24 and 34, on the front surface of the module. Some modules, e.g., 25, may not include a microprocessor. In either case, the push-button LEDs (e.g., 24 and 26 of FIG. 4)

in each module in a shelf are electrically coupled to a backplane which includes a bus, e.g., 42 and 43. The bus couples the modules in a shelf through a programmable logic chip 27 to a shelf controller, e.g., 44 and 45, which is usually contained on a separate printed circuit card at the end of the shelf. Each shelf controller is coupled via a bus, 46 or 47, on the backplane to a bay controller (BC) router, 48 or 49, which, in turn, is coupled to a local area network bus 50 such as are found in Echelon networks.

The bus 50 is electrically coupled through an interface 51 to a host computer 52. The host computer 52 has stored therein all the permissible optical connections between modules which are electrically connected to the host through bus 50.

Thus, for example, if a craftsperson desires to optically connect module 18 to its permissible mate (module 19), he or she would press the push-button 24a which is part of the push-button LED 24 on the front surface of the module 18. The depression of the button completes an electrical connection to the backplane bus 42 and thereby signals the shelf controller 44 through chip 27 that a connection is to be made to the module 18. The shelf controller has stored therein the addresses of each module on that shelf and, so, can identify which module is seeking a connection. The shelf controller sends this information to the host 52 which, as previously stated, has the permissible connections for all the modules. The host, therefore, sends messages to both shelf controllers 44 and 45 connected to modules 18 and 19, respectively. The messages tell the shelf controllers to light the LEDs (e.g., 24b) on the front of modules 18 and 19.

The craftsperson now has a visual indication on the front of the modules which are to be connected and can apply the jumper cables to those modules. This same procedure can also be followed if the optical connections already exist and the craftsperson looking at one end of a jumper cable wants to know where the other end of the jumper cable is connected.

When it is desired to turn the LEDs off, the craftsperson can press the button, e.g., 24a, on either of the modules 18 or 19, and this will signal the host to send another signal to the shelf controller to turn off the lights on modules 18 and 19.

It should be appreciated that, while the push-button LEDs are preferably located on the front surfaces of the modules, they could also be located somewhere else in the frame with a proper indication of which LED is associated with which panel.

Various modifications of the invention will become apparent to those skilled in the art. All such variations which basically rely on the teachings through which the invention has advanced the art are properly considered within the scope of the invention.

We claim:

1. A telecommunications distribution frame comprising:
    a plurality of shelves;
    a plurality of modules within each shelf for connecting a cable to jumper cables;
    means comprising a backplane including busses for electrically connecting each module to a host computer which includes a data base of which modules should be connected together by a jumper cable;
    means associated with a first module for directing a first signal to said host computer through said backplane to locate a second module to be connected thereto;
    means associated with the first and second modules for receiving a second signal from the host through said backplane, and for visually indicating that the second signal has been received,
    whereby the said modules are identified by such visual indications.

2. Apparatus according to claim 1 wherein the modules optically connect optical fibers from a cable to optical fiber jumper cables.

3. Apparatus according to claim 1 wherein the means for directing a signal comprises a push-button on a front surface of the module which is separate from the jumper cables.

4. Apparatus according to claim 1 wherein the means for visually indicating that the signal has been received from the host comprises a light emitting device on a front surface of the modules.

5. Apparatus according to claim 1 wherein the means for connecting each module to the host computer comprises controllers coupled to corresponding shelves of panels.

6. Apparatus according to claim 5 wherein the controllers coupled to each shelf are coupled to the host computer by means of a local area network buss.

7. A module for connecting a cable to a jumper cable comprising:
    means for signaling a host computer coupled to the module through a backplane, which host includes information as to where the module should be connected; and
    visual means for indicating that said signal has been sent to and received from the host computer through the backplane.

8. Apparatus according to claim 7 wherein the indicating means is a light emitting device.

9. Apparatus according to claim 7 wherein the means for signaling comprises a push-button on the front surface of the module which is separate from the jumper cable.

10. Apparatus according to claim 7 wherein the module is adapted for optically connecting fibers in the cable to optical fiber jumper cables.

* * * * *